(12) United States Patent
Deur-Bert et al.

(10) Patent No.: US 9,969,918 B2
(45) Date of Patent: *May 15, 2018

(54) AZEOTROPIC OR QUASI-AZEOTROPIC COMPOSITION OF CHLOROMETHANE

(71) Applicant: ARKEMA FRANCE, Colombes (FR)

(72) Inventors: Dominique Deur-Bert, Charly (FR); Laurent Wendlinger, Soucieu en Jarrest (FR)

(73) Assignee: ARKEMA FRANCE, Colombes (FR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/481,873

(22) Filed: Apr. 7, 2017

(65) Prior Publication Data

US 2017/0210960 A1 Jul. 27, 2017

Related U.S. Application Data

(63) Continuation of application No. 14/655,500, filed as application No. PCT/FR2013/052975 on Dec. 6, 2013, now Pat. No. 9,650,553.

(30) Foreign Application Priority Data

Dec. 26, 2012 (FR) ..................................... 12 62763

(51) Int. Cl.
*C09K 5/04* (2006.01)
*C09K 3/00* (2006.01)

(52) U.S. Cl.
CPC ................ *C09K 5/045* (2013.01); *C09K 3/00* (2013.01); *C09K 5/04* (2013.01)

(58) Field of Classification Search
CPC . C09K 5/04; C09K 5/044; C09K 3/30; C09K 5/045; C09K 3/00; B01F 17/0035; B01F 17/0085; H01B 3/56
USPC ............................ 252/67; 510/177, 408, 415
See application file for complete search history.

(56) References Cited

U.S. PATENT DOCUMENTS

| | | | | |
|---|---|---|---|---|
| 5,294,358 A * | 3/1994 | Dantinne | ................ | C09K 5/045 252/364 |
| 7,629,397 B2 * | 12/2009 | McDonald | ................ | C08C 1/14 210/262 |
| 8,007,677 B2 * | 8/2011 | Knapp | .................... | C07C 17/25 203/29 |
| 8,070,977 B2 | 12/2011 | Rached | | |
| 8,075,798 B2 | 12/2011 | Rached | | |
| 8,246,850 B2 | 8/2012 | Rached | | |
| 8,252,198 B2 | 8/2012 | Rached | | |
| 8,557,135 B2 | 10/2013 | Rached | | |
| 8,808,569 B2 | 8/2014 | Rached | | |
| 8,858,824 B2 | 10/2014 | Boussand | | |
| 8,858,825 B2 | 10/2014 | Guerin et al. | | |
| 9,011,711 B2 | 4/2015 | Rached | | |
| 9,028,706 B2 | 5/2015 | Rached et al. | | |
| 9,039,922 B2 | 5/2015 | Rached | | |
| 9,127,191 B2 | 9/2015 | Rached | | |
| 9,133,379 B2 | 9/2015 | Rached | | |
| 9,175,203 B2 | 11/2015 | Rached | | |
| 9,267,064 B2 | 2/2016 | Rached | | |
| 9,315,708 B2 | 4/2016 | Guerin et al. | | |
| 9,399,726 B2 * | 7/2016 | Rached | .................... | C09K 5/045 |
| 9,505,968 B2 * | 11/2016 | Rached | .................... | C08J 9/146 |
| 9,512,343 B2 * | 12/2016 | Rached | .................... | C09K 5/045 |
| 9,584,984 B2 | 2/2017 | Huber et al. | | |
| 9,599,381 B2 | 3/2017 | Rached | | |
| 9,650,551 B2 | 5/2017 | Collier et al. | | |
| 9,650,553 B2 * | 5/2017 | Deur-Bert | .............. | C09K 5/044 |
| 9,663,697 B2 | 5/2017 | Rached | | |
| 9,676,984 B2 | 6/2017 | Guerin et al. | | |
| 9,683,155 B2 | 6/2017 | Deur-Bert et al. | | |
| 9,683,157 B2 | 6/2017 | Rached | | |
| 2005/0101751 A1 * | 5/2005 | Shaffer | .................... | C08F 2/06 526/242 |

(Continued)

FOREIGN PATENT DOCUMENTS

EP 0 495 543 A1 7/1992
WO WO 2013/096005 A1 6/2013

OTHER PUBLICATIONS

U.S. Appl. No. 13/128,996, filed May 12, 2011, Wissam Rached, (Cited herein as US Patent Application Publication No. 2011/0219791 A1 of Sep. 15, 2011).
U.S. Appl. No. 13/129,240, filed May 13, 2011, Wissam Rached, (Cited herein as US Patent Application Publication No. 2011/0219792 A1 of Sep. 15, 2011).
U.S. Appl. No. 13/146,721, filed Jul. 28, 2011, Wissam Rached, (Cited herein as US Patent Application Publication No. 2011/0284181 A1 of Nov. 24, 2011).
U.S. Appl. No. 13/808,326, filed Jan. 4, 2013, Béatrice Boussand, (Cited herein as US Patent Application Publication No. 2013/0105724 A1 of May 2, 2013).
U.S. Appl. No. 14/371,118, filed Jul. 8, 2014, Béatrice Boussand, (Cited herein as US Patent Application Publication No. 2015/0027146 A1 of Jan. 29, 2015).
U.S. Appl. No. 14/615,780, filed Feb. 6, 2015, Wissam Rached, (Cited herein as US Patent Application Publication No. 2015/0152307 A1 of Jun. 4, 2015).

(Continued)

*Primary Examiner* — Douglas J McGinty
(74) *Attorney, Agent, or Firm* — Buchanan Ingersoll & Rooney P.C.

(57) ABSTRACT

Quasi-azeotropic or azeotropic compositions containing chloromethane and at least one or more compound(s) selected from 2,3,3,3-tetrafluoropropene, 3,3,3-trifluoropropene, 1,1,1,2-tetrafluoroethane, 1,1,1,2,2-pentafluoropropane, E/Z-1,1,3,3,3-pentafluoropropene, E/Z-1,2,3,3,3-pentafluoropropene, 1,1-difluoroethane and E-1,3,3,3-tetrafluoropropene. The composition may include either from 0.5 to 70 mol % of chloromethane and at least from 99.5 to 30 mol % of a compound selected from 2,3,3,3-tetrafluoropropene, 1,1-difluoroethane, 3,3,3-trifluoropropene and 1,1,1,2-tetrafluoroethane, or from 55 to 95 mol % of chloromethane and at least from 45 to 5 mol % of one or more compound(s) selected from 1,1,1,2,2-pentafluoropropane, E/Z-1,1,3,3,3-pentafluoropropene, E/Z-1,2,3,3,3-pentafluoropropene and E-1,3,3,3-tetrafluoropropene.

4 Claims, No Drawings

(56) References Cited

U.S. PATENT DOCUMENTS

| | | | |
|---|---|---|---|
| 2008/0051612 A1* | 2/2008 | Knapp | C07C 17/25 570/178 |
| 2011/0084228 A1 | 4/2011 | Rached | |
| 2011/0095224 A1 | 4/2011 | Rached | |
| 2011/0186772 A1 | 8/2011 | Rached | |
| 2011/0219791 A1 | 9/2011 | Rached | |
| 2011/0219792 A1 | 9/2011 | Rached | |
| 2011/0240254 A1 | 10/2011 | Rached | |
| 2011/0284181 A1 | 11/2011 | Rached | |
| 2012/0049104 A1 | 3/2012 | Rached | |
| 2012/0056123 A1 | 3/2012 | Rached | |
| 2012/0068105 A1 | 3/2012 | Rached et al. | |
| 2012/0144857 A1 | 6/2012 | Rached | |
| 2012/0151958 A1 | 6/2012 | Rached | |
| 2012/0151959 A1 | 6/2012 | Rached | |
| 2012/0153213 A1 | 6/2012 | Rached | |
| 2012/0159982 A1 | 6/2012 | Rached | |
| 2012/0161064 A1 | 6/2012 | Rached | |
| 2012/0167615 A1 | 7/2012 | Rached | |
| 2012/0205574 A1 | 8/2012 | Rached et al. | |
| 2012/0261252 A1* | 10/2012 | Knapp | C07C 17/383 203/62 |
| 2013/0092869 A1 | 4/2013 | Boussand | |
| 2013/0096005 A1* | 4/2013 | Guenthenspberger | A01N 43/54 504/242 |
| 2013/0105724 A1 | 5/2013 | Boussand | |
| 2013/0158218 A1* | 6/2013 | Thomas | C08F 2/06 526/206 |
| 2013/0186114 A1 | 7/2013 | Guerin et al. | |
| 2014/0008565 A1 | 1/2014 | Rached et al. | |
| 2014/0075969 A1 | 3/2014 | Guerin et al. | |
| 2014/0318160 A1 | 10/2014 | Rached | |
| 2014/0326017 A1 | 11/2014 | Rached | |
| 2015/0027146 A1 | 1/2015 | Boussand | |
| 2015/0152306 A1 | 6/2015 | Rached | |
| 2015/0152307 A1 | 6/2015 | Rached | |
| 2015/0322317 A1* | 11/2015 | Collier | C09K 5/045 252/67 |
| 2015/0322321 A1 | 11/2015 | Deur-Bert et al. | |
| 2015/0344761 A1 | 12/2015 | Rached | |
| 2015/0353799 A1 | 12/2015 | Deur-Bert et al. | |
| 2015/0353802 A1 | 12/2015 | Rached | |
| 2016/0009555 A1 | 1/2016 | Bonnet et al. | |
| 2016/0024363 A1 | 1/2016 | Rached | |
| 2016/0025394 A1 | 1/2016 | Rached | |
| 2016/0115361 A1 | 4/2016 | Boussand | |
| 2016/0122609 A1 | 5/2016 | Rached | |
| 2016/0194541 A1 | 7/2016 | Guerin et al. | |
| 2016/0244652 A1* | 8/2016 | Rached | C09K 5/045 |
| 2016/0272561 A1* | 9/2016 | Rached | C07C 17/42 |
| 2016/0298014 A1* | 10/2016 | Rached | C09K 5/045 |
| 2016/0355718 A1* | 12/2016 | Rached | C09K 5/045 |
| 2016/0376484 A1* | 12/2016 | Guerin | C11D 7/06 62/77 |
| 2017/0037291 A1 | 2/2017 | Rached et al. | |
| 2017/0080773 A1 | 3/2017 | Rached | |
| 2017/0145276 A1 | 5/2017 | Rached | |

OTHER PUBLICATIONS

U.S. Appl. No. 14/830,130, filed Aug. 19, 2015, Wissam Rached, (Cited herein as US Patent Application Publication No. 2015/0353802 a1 of Dec. 10, 2015).

U.S. Appl. No. 14/772,950, filed Sep. 4, 2015, Phillippe Bonnet, (Cited herein as US Patent Application Publication No. 2016/0009555 A1 of Jan. 14, 2016).

U.S. Appl. No. 14/990,159, filed Jan. 7, 2016, Béatrice Boussand, (Cited herein as US Patent Application Publication No. 2016/0115361 A1 of Apr. 28, 2016).

U.S. Appl. No. 14/992,387, filed Jan. 11, 2016, Wissam Rached, (Cited herein as US Patent Application Publication No. 2016/0122609 A1 of May 5, 2016).

U.S. Appl. No. 15/073,108, filed Mar. 17, 2016, Wissam Rached, (Cited herein as US Patent Application Publication No. 2016/0272561 A1 of Sep. 22, 2016).

U.S. Appl. No. 15/238,883, filed Aug. 17, 2016, Wissam Rached, (Cited herein as US Patent Application Publication No. 2016/0355718 A1 of Dec. 8, 2016).

U.S. Appl. No. 14/903,461, filed Jan. 7, 2016, Sophie Guerin, (Cited herein as US Patent Application Publication No. 2016/0376484 A1 of Dec. 29, 2016).

U.S. Appl. No. 15/297,569, filed Oct. 19, 2016, Wissam Rached, (Cited herein as US Patent Application Publication No. 2017/0037291 A1 of Feb. 9, 2017).

U.S. Appl. No. 15/368,347, filed Dec. 2, 2016, Wissam Rached, (Cited herein as US Patent Application Publication No. 2017/0080773 A1 of Mar. 23, 2017).

U.S. Appl. No. 15/396,855, filed Jan. 3, 2017, Wissam Rached, (Cited herein as US Patent Application Publication No. 2017/0145276 A1 of May 25, 2017).

U.S. Appl. No. 15/481,815, filed Apr. 7, 2017, Bertrand Collier.

U.S. Appl. No. 15/490,541, filed Apr. 18, 2017, Dominique Deur-Bert.

U.S. Appl. No. 15/491,717, filed Apr. 19, 2017, Wissam Rached.

U.S. Appl. No. 15/481,815, Collier et al.

U.S. Appl. No. 15/490,541, Deur-Bert et al.

U.S. Appl. No. 15/491,717, Rached.

International Search Report (PCT/ISA/210) dated Mar. 11, 2014, by the French Patent Office as the International Searching Authority for International Application No. PCT/FR2013/052975, 3 pages.

Collier, Bertrand, et al., U.S. Appl. No. 15/481,815 entitled "Composition Including 2,3,3,3-Tetrafluoropropene," filed Apr. 7, 2017.

Deur-Bert, Dominique, et al., U.S. Appl. No. 15/490,541 entitled "Composition Containing 2,3,3,3-Tetrafluoropropene and 1,2-Difluoroethylene," filed Apr. 18, 2017.

Rached, Wissam, U.S. Appl. No. 15/491,717 entitled "Heat Transfer Method," filed Apr. 19, 2017.

U.S. Appl. No. 15/809,164, filed Nov. 10, 2017, Wissam Rached.
U.S. Appl. No. 15/820,996, filed Nov. 22, 2017, Wissam Rached.
U.S. Appl. No. 15/856,703, filed Dec. 28, 2017, Wissam Rached.
U.S. Appl. No. 15/878,794, filed Jan. 24, 2018, Wissam Rached, Sophie Guerin and Pascale Kindler.

Rached, Wissam, U.S. Appl. No. 15/809,164 entitled "Vehicle Heating and/or Air Conditioning Method", filed in the U.S. Patent and Trademark Office dated Nov. 10, 2017.

Rached, Wissam, U.S. Appl. No. 15/820,996 entitled "Method of Heating and/or Air Conditioning a Vehicle", filed in the U.S. Patent and Trademark Office dated Nov. 22, 2017.

Rached, Wissam, U.S. Appl. No. 15/856,703 entitled "Binary Refrigerating Fluid", filed in the U.S. Patent and Trademark Office dated Dec. 26, 2017.

Rached, Wissam, U.S. Appl. No. 15/878,794 entitled "Stabilization of 1-Chloro-3,3,3-Trifluoropropene", filed in the U.S. Patent and Trademark Office dated Jan. 24, 2018.

* cited by examiner

AZEOTROPIC OR QUASI-AZEOTROPIC COMPOSITION OF CHLOROMETHANE

CROSS REFERENCE TO RELATED APPLICATIONS

The present application is a continuation of U.S. application Ser. No. 14/655,500, filed on Jun. 25, 2015, now U.S. Pat. No. 9,650,553, which is a U.S. national stage of International Application No. PCT/FR2013/052975, filed on Dec. 6, 2013, which claims the benefit of French Application No. 12.62763, filed on Dec. 26, 2012. The entire contents of each of U.S. application Ser. No. 14/655,500, International Application No. PCT/FR2013/052975, and French Application No. 12.62763 are hereby incorporated herein by reference in their entirety.

TECHNICAL FIELD

The present invention relates to azeotropic or quasi-azeotropic compositions comprising chloromethane.

SUMMARY

Fluids based on halocarbons have found many applications in various industrial fields, in particular as heat transfer fluid, propellants, foaming agents, blowing agents, gaseous dielectrics, monomer or polymerization medium, support fluids, agents for abrasives, drying agents and fluids for energy production units.

Particular importance is given to fluids that have a low impact on the environment.

The advantage of using azeotropic or quasi-azeotropic fluids is that they do not fractionate during evaporation processes and act (almost) as a pure body. However, it is difficult to identify novel fluids that meet these characteristics, since azeotropes cannot be predicted.

DETAILED DESCRIPTION

The invention thus relates to an azeotropic or quasi-azeotropic composition comprising chloromethane and at least one or more compound(s) selected from 2,3,3,3-tetrafluoropropene, 3,3,3-trifluoropropene, 1,1,1,2-tetrafluoroethane, 1,1,1,2,2-pentafluoropropane, E/Z-1,1,3,3,3-pentafluoropropene, E/Z-1,2,3,3,3-pentafluoropropene, 1,1-difluoroethane and E-1,3,3,3-tetrafluoropropene.

The expression "quasi-azeotropic" has a broad meaning and is intended to include the compositions that are strictly azeotropic and those that behave as an azeotropic mixture. A mixture is azeotropic when the pressure at the dew point is equal to that at the bubble point, which means that the vapor composition is equal to that of the condensed liquid.

A mixture is considered to be quasi-azeotropic when the pressure difference between the pressure at the dew point and the pressure at the bubble point is less than or equal to 5%, on the basis of the pressure at the bubble point.

According to one embodiment, the composition according to the invention comprises, preferably essentially consisting of, either (from) 0.5 to 70 mol % of chloromethane and from 99.5 to 30 mol % of at least one compound selected from 2,3,3,3-tetrafluoropropene, 1,1-difluoroethane, 3,3,3-trifluoropropene and 1,1,1,2-tetrafluoroethane, or (from) 55 to 95 mol % of chloromethane and (from) 45 to 5 mol % of at least one compound selected from 1,1,1,2,2-pentafluoropropane, E/Z-1,1,3,3,3-pentafluoropropene, E/Z-1,2,3,3,3-pentafluoropropene and E-1,3,3,3-tetrafluoropropene.

According to one preferred embodiment, the composition according to the invention comprises, preferably essentially consisting of, chloromethane, preferably from 10 to 50 mol %, and at least compound(s) selected from 2,3,3,3-tetrafluoropropene, 3,3,3-trifluoropropene, E/Z-1,1,3,3,3-pentafluoropropene, E/Z-1,2,3,3,3-pentafluoropropene and E-1,3,3,3-tetrafluoropropene, preferably 2,3,3,3-tetrafluoropropene, preferably representing 50 to 90 mol %.

According to one particularly preferred embodiment, the composition according to the invention comprises, preferably essentially consisting of, (from) 10 to 45 mol % of chloromethane and (from) 90 to 55 mol % of 2,3,3,3-tetrafluoropropene.

In one embodiment, the composition according to the invention comprises, preferably essentially consisting of, (from) 0.5 to 50 mol % of chloromethane and (from) 95.5 to 50 mol % of 1,1,1,2-tetrafluoroethane.

In another embodiment, the composition according to the invention comprises, preferably essentially consisting of, (from) 35 to 65 mol % of chloromethane and (from) 65 to 35 mol % of 3,3,3-trifluoropropene.

According to one embodiment, the composition according to the invention comprises, preferably essentially consisting of, (from) 60 to 90 mol % of chloromethane and (from) 40 to 10 mol % of 1,1,1,2,2-pentafluoropropane.

According to another embodiment, the composition according to the invention comprises, preferably essentially consisting of, (from) 55 to 85 mol % of chloromethane and (from) 45 to 15 mol % of E/Z-1,1,3,3,3-pentafluoropropene.

According to one possibility offered by the invention, the composition according to the invention comprises, preferably essentially consisting of, (from) 60 to 90 mol % of chloromethane and (from) 40 to 10 mol % of E/Z-1,2,3,3,3-pentafluoropropene.

In one embodiment, the composition according to the invention comprises, preferably essentially consisting of, (from) 5 to 70 mol %, preferably from 10 to 60 mol % of chloromethane and (from) 95 to 30 mol %, preferably 40 to 90 mol % of 1,1-difluoroethane.

In another embodiment, the composition according to the invention comprises, preferably essentially consisting of, (from) 65 to 95 mol % of chloromethane and (from) 35 to 5 mol % of E-1,3,3,3-tetrafluoropropene.

According to one possibility offered by the invention, the composition may also comprise hydrogen fluoride.

According to one particularly preferred possibility offered by the invention, the composition according to the invention comprises, preferably essentially consisting of, (from) 20 to 45 mol % of HF, 5 to 20 mol % of chloromethane and 35 to 70 mol % of 2,3,3,3-tetrafluoropropene.

According to one embodiment, the composition according to the invention comprises, preferably essentially consisting of, (from) 15 to 45 mol % of HF, 35 to 60 mol % of chloromethane and 15 to 30 mol % of 1,1,1,2,2-pentafluoropropane.

According to another embodiment, the composition according to the invention is characterized in that it comprises, preferably essentially consisting of, (from) 15 to 45 mol % of HF, 1 to 30 mol % of chloromethane and 30 to 85 mol % of 1,1-difluoroethane.

According to one embodiment, the composition according to the invention comprises, preferably essentially consisting of, (from) 15 to 40 mol % of HF, 40 to 70 mol % of chloromethane and 10 to 30 mol % of E/Z-1,3,3,3-tetrafluoropropene.

According to another embodiment, the composition according to the invention has a boiling point between from −40° C. to 70° C. at a pressure of between 1 and 15 bar.

The invention also relates to the use of a fluid comprising the composition according to the invention as heat transfer fluid, propellants, foaming agents, blowing agents, gaseous dielectrics, monomer or polymerization medium, support fluids, agents for abrasives, drying agents and fluids for energy production units.

Preferably, the invention relates to the use of a fluid comprising the composition according to the invention as heat transfer fluid in a heat pump or refrigeration plant.

The invention also relates to a heat transfer plant comprising a vapor compression circuit containing a fluid comprising a composition according to the invention as heat transfer fluid or containing a heat transfer fluid as described above.

According to one embodiment, the plant is selected from mobile or stationary plants for heating via a heat pump, for air conditioning, and in particular for motor vehicle air conditioning or for centralized stationary air conditioning, for refrigeration or for freezing and Rankine cycles; and which is preferably an air conditioning plant.

The invention also relates to a process for heating or cooling a fluid or a body by means of a vapor compression circuit containing a heat transfer fluid, said process successively comprising the evaporation of the heat transfer fluid, the compression of the heat transfer fluid, the condensation of the heat fluid and the expansion of the heat transfer fluid, in which the heat transfer fluid is a fluid comprising a composition according to the invention.

The expression "heat transfer fluid" is understood to mean a fluid capable of absorbing heat by evaporating at low temperature and low pressure and of releasing heat by condensing at high temperature and high pressure, in a vapor compression circuit.

A heat transfer fluid optionally comprises one or more additives which are not heat transfer compounds for the envisaged application. The additives may in particular be selected from lubricants, nanoparticles, stabilizers, surfactants, tracers, fluorescent agents, odorous agents and solubilizing agents, as are well known to a person skilled in the art.

In what follows, the following compounds represent:
chloromethane: HCC-40 or F40
2,3,3,3-tetrafluoropropene: HFO-1234yf or F1234yf
3,3,3-trifluoropropene: HFO-1243zf or F1243zf
1,1,1,2-tetrafluoroethane: HFC-134a or F134a
1,1,1,2,2-pentafluoropropane: HFC-245cb or F245cb
E/Z-1,1,3,3,3-pentafluoropropene: HFO-1225zc or F1225zc
E/Z-1,2,3,3,3-pentafluoropropene: HFO-1225ye or F1225ye
1,1-difluoroethane: HFC-152a or F152a
E-1,3,3,3-tetrafluoropropene: HFO-1234ze-E or F1234ze-E.

The azeotropic compositions representative of the invention, non-limitingly, at various temperatures and pressures, are presented in table 1 below:

TABLE 1

| | Pressure: 1 bar absolute | | | Pressure 3 bar absolute | | |
|---|---|---|---|---|---|---|
| Azeotrope | Temperature (° C.) | Mole (%) of F40 | Mole (%) of Compound 2 | Temperature ° C. | Mole (%) of F40 | Mole (%) of Compound 2 |
| F40/F1234yf | −30 | 34 | 66 | −2.0 | 34 | 66 |
| F40/F1243zf | −27 | 53 | 47 | 1 | 54 | 46 |
| F40/F134a | −28 | 35 | 65 | 0 | 22 | 78 |
| F40/F245cb | −26 | 76 | 24 | 3 | 76 | 24 |
| F40/F1225zc | −25 | 70 | 30 | 3 | 69 | 31 |
| F40/F1225ye | −25 | 74 | 26 | 3.0 | 72 | 28 |
| F40/F152a | −25 | 54 | 46 | 3.0 | 42 | 58 |
| F40/F1234ze-E | −24 | 80 | 20 | 4.0 | 81 | 19 |

| | Pressure 10 bar absolute | | | Pressure 15 bar absolute | | |
|---|---|---|---|---|---|---|
| Azeotrope | Temperature (° C.) | Mole (%) of F40 | Mole (%) of Compound 2 | Temperature ° C. | Mole (%) of F40 | Mole (%) of Compound 2 |
| F40/F1234yf | 38 | 66 | 34 | 55 | 65 | 35 |
| F40/F1243zf | 40 | 55 | 45 | 59 | 56 | 44 |
| F40/F134a | 39 | 3 | 97 | — | — | — |
| F40/F245cb | 44 | 78 | 22 | 60 | 78 | 22 |
| F40/F1225zc | 44 | 68 | 32 | 60 | 68 | 32 |
| F40/F1225ye | 43 | 70 | 30 | 60 | 69 | 31 |
| F40/F152a | 43 | 27 | 73 | 59 | 21 | 79 |
| F40/F1234ze-E | 45 | 83 | 17 | 62 | 84 | 16 |

EMBODIMENTS

1. An azeotropic or quasi-azeotropic composition comprising chloromethane and at least one or more compound(s) selected from 2,3,3,3-tetrafluoropropene, 3,3,3-trifluoropropene, 1,1,1,2-tetrafluoroethane, 1,1,1,2,2-pentafluoropropane, E/Z-1,1,3,3,3-pentafluoropropene, E/Z-1,2,3,3,3-pentafluoropropene, 1,1-difluoroethane and E-1,3,3,3-tetrafluoropropene.

2. The composition as in embodiment 1, characterized in that it comprises, preferably essentially consisting of, either from 0.5 to 70 mol % of chloromethane and at least from 99.5 to 30 mol % of a compound selected from 2,3,3,3-tetrafluoropropene, 1,1-difluoroethane, 3,3,3-trifluoropropene and 1,1,1,2-tetrafluoroethane, or from 55 to 95 mol % of chloromethane and at least from 45 to 5 mol % of one or more compound(s) selected from 1,1,1,2,2-pentafluoropropane, E/Z-1,1,3,3,3-pentafluoropropene, E/Z-1,2,3,3,3-pentafluoropropene and E-1,3,3,3-tetrafluoropropene.

3. The composition as in embodiment 1 or embodiment 2, characterized in that the composition comprises, preferably essentially consisting of, chloromethane and at least one or more compound(s) selected from 2,3,3,3-tetrafluoropropene, 3,3,3-trifluoropropene, E/Z-1,1,3,3,3-pentafluoropropene, E/Z-1,2,3,3,3-pentafluoropropene and E-1,3,3,3-tetrafluoropropene, preferably 2,3,3,3-tetrafluoropropene.

4. The composition as in any one of embodiments 1 to 3, characterized in that it comprises, preferably essentially consisting of, either from 20 to 50 mol % of chloromethane and from 80 to 50 mol % preferably consisting of 2,3,3,3-tetrafluoropropene.

5. The composition as in embodiment 1 or embodiment 2, characterized in that it comprises, preferably essentially consisting of, from 0.5 to 50 mol % of chloromethane and from 95.5 to 50 mol % of 1,1,1,2-tetrafluoroethane.

6. The composition as in any one of embodiments 1 to 3, characterized in that it comprises, preferably essentially consisting of, from 35 to 65 mol % of chloromethane and from 65 to 35 mol % of 3,3,3-trifluoropropene.

7. The composition as in embodiment 1 or embodiment 2, characterized in that it comprises, preferably essentially consisting of, from 60 to 90 mol % of chloromethane and from 40 to 10 mol % of 1,1,1,2,2-pentafluoropropane.

8. The composition as in any one of embodiments 1 to 3, characterized in that it comprises, preferably essentially consisting of, from 55 to 85 mol % of chloromethane and from 45 to 15 mol % of E/Z-1,1,3,3,3-pentafluoropropene.

9. The composition as in any one of embodiments 1 to 3, characterized in that it comprises, preferably essentially consisting of, from 60 to 90 mol % of chloromethane and from 40 to 10 mol % of E/Z-1,2,3,3,3-pentafluoropropene.

10. The composition as in embodiment 1 or embodiment 2, characterized in that it comprises, preferably essentially consisting of, from 5 to 70 mol % of chloromethane and from 95 to 30 mol % of 1,1-difluoroethane.

11. The composition as in any one of embodiments 1 to 3, characterized in that it comprises, preferably essentially consisting of, from 65 to 95 mol % of chloromethane and from 35 to 5 mol % of E-1,3,3,3-tetrafluoropropene.

12. The composition as in any one of the preceding embodiments, characterized in that it comprises at least hydrogen fluoride.

13. The composition as in embodiment 12, characterized in that it comprises, preferably essentially consisting of, from 20 to 45 mol % of HF, 5 to 20 mol % of chloromethane and 35 to 70 mol % of 2,3,3,3-tetrafluoropropene.

14. The composition as in embodiment 12, characterized in that it comprises, preferably essentially consisting of, from 15 to 45 mol % of HF, 35 to 60 mol % of chloromethane and 15 to 30 mol % of 1,1,1,2,2-pentafluoropropane.

15. The composition as in embodiment 12, characterized in that it comprises, preferably essentially consisting of, from 15 to 45 mol % of HF, 1 to 30 mol % of chloromethane and 30 to 85 mol % of 1,1-difluoroethane.

16. The composition as in embodiment 12, characterized in that it comprises, preferably essentially consisting of, from 15 to 40 mol % of HF, 40 to 70 mol % of chloromethane and 10 to 30 mol % of E/Z-1,3,3,3-tetrafluoropropene.

17. The composition as in any one of the preceding embodiments, characterized in that it has a boiling point between from −40° C. to 70° C. and a pressure of between 1 and 15 bar.

The invention claimed is:

1. An azeotropic or quasi-azeotropic composition comprising:
   5 to 20 mol % of chloromethane,
   20 to 45 mol % of HF, and
   35 to 70 mol % of 2,3,3,3-tetrafluoropropene.

2. An azeotropic or quasi-azeotropic composition comprising:
   35 to 60 mol % of chloromethane,
   15 to 45 mol % of HF, and
   15 to 30 mol % of 1,1,1,2,2-pentafluoropropane.

3. An azeotropic or quasi-azeotropic composition comprising:
   1 to 30 mol % of chloromethane,
   15 to 45 mol % of HF, and
   30 to 85 mol % of 1,1-difluoroethane.

4. An azeotropic or quasi-azeotropic composition comprising:
   40 to 70 mol % of chloromethane,
   15 to 40 mol % of HF, and
   10 to 30 mol % of E-1,3,3,3-tetrafluoropropene.

* * * * *